United States Patent [19]
Shirk et al.

[11] Patent Number: 5,830,250
[45] Date of Patent: Nov. 3, 1998

[54] STEPPED HOT GAS FILTER CARTRIDGE

[75] Inventors: Ryan C. Shirk, Mendota Heights, Minn.; Rich L. Bloom, Woodville, Wis.; Troy K. Ista, River Falls, Minn.

[73] Assignee: Minnesota Mining and Manufacturing Company, St. Paul, Minn.

[21] Appl. No.: 611,800

[22] Filed: Mar. 6, 1996

[51] Int. Cl.⁶ .................................................. B01D 46/02
[52] U.S. Cl. ............................. 55/498; 55/378; 55/497; 55/523; 55/DIG. 10; 55/DIG. 30
[58] Field of Search ............................. 55/378, 379, 282, 55/492, 498, 521, 523, DIG. 10, DIG. 30, 497; 210/322.2, 451, 497.1

[56] References Cited

U.S. PATENT DOCUMENTS

| | | |
|---|---|---|
| 1,639,133 | 1/1927 | Greene . |
| 3,100,190 | 8/1963 | Hobson, Jr. . |
| 3,407,572 | 10/1968 | Tolley . |
| 3,535,852 | 10/1970 | Hirs . |
| 3,540,190 | 11/1970 | Brink, Jr. . |
| 3,708,965 | 1/1973 | Domnick . |
| 3,853,508 | 12/1974 | Gordon et al. . |
| 3,992,177 | 11/1976 | Welteroth . |
| 4,073,632 | 2/1978 | Reinauer et al. . |
| 4,211,543 | 7/1980 | Tokar et al. ............................. 55/497 |
| 4,251,238 | 2/1981 | Claes et al. . |
| 4,348,362 | 9/1982 | Foss . |
| 4,398,931 | 8/1983 | Shevlin . |
| 4,519,102 | 5/1985 | Efstratis . |
| 4,829,766 | 5/1989 | Henkel . |
| 4,940,476 | 7/1990 | Buck . |
| 5,058,381 | 10/1991 | Christenson et al. . |
| 5,171,341 | 12/1992 | Merry . |
| 5,174,969 | 12/1992 | Fischer et al. . |
| 5,180,409 | 1/1993 | Fischer . |
| 5,190,571 | 3/1993 | Fay et al. . |
| 5,205,850 | 4/1993 | Jenrich et al. . |
| 5,224,973 | 7/1993 | Hoppenstedt et al. . |
| 5,228,891 | 7/1993 | Adiletta . |
| 5,238,472 | 8/1993 | Pfister et al. . |
| 5,248,481 | 9/1993 | Bloom et al. . |
| 5,248,482 | 9/1993 | Bloom . |
| 5,258,164 | 11/1993 | Bloom et al. . |
| 5,298,046 | 3/1994 | Peisert . |
| 5,409,669 | 4/1995 | Smith et al. . |
| 5,453,116 | 9/1995 | Fischer et al. . |

FOREIGN PATENT DOCUMENTS

| | | | |
|---|---|---|---|
| 0150251 | 4/1951 | Australia ............................. | 210/497.1 |
| 0 608 783 A1 | 1/1993 | European Pat. Off. . | |
| PCT/US 96/12139 | 7/1996 | European Pat. Off. . | |
| 3823205 A1 | 7/1988 | Germany . | |

*Primary Examiner*—Jay H. Woo
*Assistant Examiner*—Minh-Chau T. Pham
*Attorney, Agent, or Firm*—Gary L. Griswold; Walter N. Kirn; Harold C. Knecht, III

[57] ABSTRACT

A regenerable gas filter cartridge for filtering particles from an exhaust gas includes a hollow tube having a perforated portion and an open end portion. The perforated portion has a diameter larger than the diameter of the open end portion. A filtering element is disposed on the hollow tube, and the filtering element extends over the larger diameter of the perforated portion and the smaller diameter of the open end portion.

19 Claims, 2 Drawing Sheets

STEPPED HOT GAS FILTER CARTRIDGE

BACKGROUND OF THE INVENTION

This invention relates generally to filters for the removal of particulate matter from gas streams, and more particularly to a filter suitable for improving the flow rate and pressure drop capability of a regenerable filter cartridge. While this application discusses the present invention in the context of a diesel engine exhaust filter, the invention is easily adaptable to filter particulates from other types of gas streams.

Diesel engines emit a hazardous, sooty exhaust that can be rendered less hazardous by using diesel particulate filters. The filters trap soot particles emitted by an engine and thereby prevent the particles from entering the atmosphere. However, the soot trapped by such filters builds up over time. As the soot builds up in the filter, the effectiveness of the filter decreases, an increased pressure drop occurs across the filter, and the engine experiences an increased exhaust gas back pressure which decreases engine performance. Therefore, the clogged filter must periodically be either replaced or regenerated. Depending upon the speed with which the filter fills with soot particles, replacement of clogged filters is inconvenient and expensive. Therefore, periodic regeneration of the filter (i.e., removal of the trapped soot) is the preferred method of maintaining a clean filter.

There are several techniques for regenerating diesel particulate filters. The methods typically involve igniting the trapped soot particles in the filter and thereby burning the soot out of the filter. One technique involves the periodic release of a burning gas into the filter, as disclosed in U.S. Pat. No. 4,912,920 to Hirabayashi. Another technique utilizes electrical heating elements in contact with the filtering elements. An electrically regenerable filter is illustrated in U.S. Pat. No. 5,252,164 to Bloom et al. Yet a third technique utilizes microwave energy to heat the filter and cause the particulates trapped in the filter to ignite and burn, thereby regenerating the filter. A microwave regenerable filter is illustrated in U.S. Pat. No. 5,453,116 to Fischer et al.

Filter assemblies regenerated by igniting trapped soot with a burning gas additive or electrical resistance heating typically used metallic structures to support the filtering element or to provide resistance heating, while filters regenerate by igniting trapped soot with microwave energy typically use porous non-metallic structures to support the filtering element. A perforated metal tube, screen, rolled wire or similar structure is often used to provide support to a filtering element. For example, U.S. Pat. No. 5,258,164 to Bloom et al. discloses an electrically resistive expanded metal sleeve 21 positioned between an inner filter elements 20 and an outer filter element 22 which is used to heat and thereby regenerate the filtering elements 20, 22. Diesel exhaust enters the interior of the porus support structure and passes radially through the filtering elements 20, 22.

The use of a regenerable filter cartridge is limited by the flow rate of the exhaust gas in the filter cartridge and the pressure drop across the filter cartridge. As the flow rate or pressure drop across the filter cartridge is increased, the force exerted against the inside of the filtering element increases. The increase in force often causes the filtering element to expand or "balloon" near the middle of the filter cartridge which has the resultant effect of shortening the overall length of the filtering element. As the filtering element balloons, the porous structure which provides support to the filtering element may be exposed at its end, and the exhaust gas allowed to flow out of the filter cartridge without passing through the filtering element. The resultant leak reduces filter cartridge performance.

A need thus exists for a regenerable filter cartridge which is effective as a filter resistant to failure due to "ballooning" of the filtering element, and which is easy to manufacture at a low cost.

SUMMARY OF THE INVENTION

The present invention is a device and method for maintaining a clean gas stream. The invention includes a particulate filter comprising a longitudinal hollow tube having a perforated portion and an open ended portion. The open ended portion has a first outer diameter, and the perforated portion has a second outer diameter. The first diameter of the open ended portion is smaller than the second diameter of the perforated portion. A filtering element is disposed about the hollow tube and extends over the second diameter of the perforated portion and the first diameter of the open ended portion.

While the above-identified drawings set forth a preferred embodiments, this disclosure presents illustrative embodiments of the present invention by way of representation and not limitation. It should be understood that numerous other modifications and embodiments can be devised by those skilled in the art which fall within the scope and spirit of the principals of this invention.

DETAILED DESCRIPTION OF THE PREFERRED EMBODIMENTS

The present invention provides an efficient filter cartridge suited for regeneration (i.e., burning out the collected soot). The present invention is particularly suited to prevent "ballooning" of the filtering media of the particulate cartridge during use.

Figure 1:
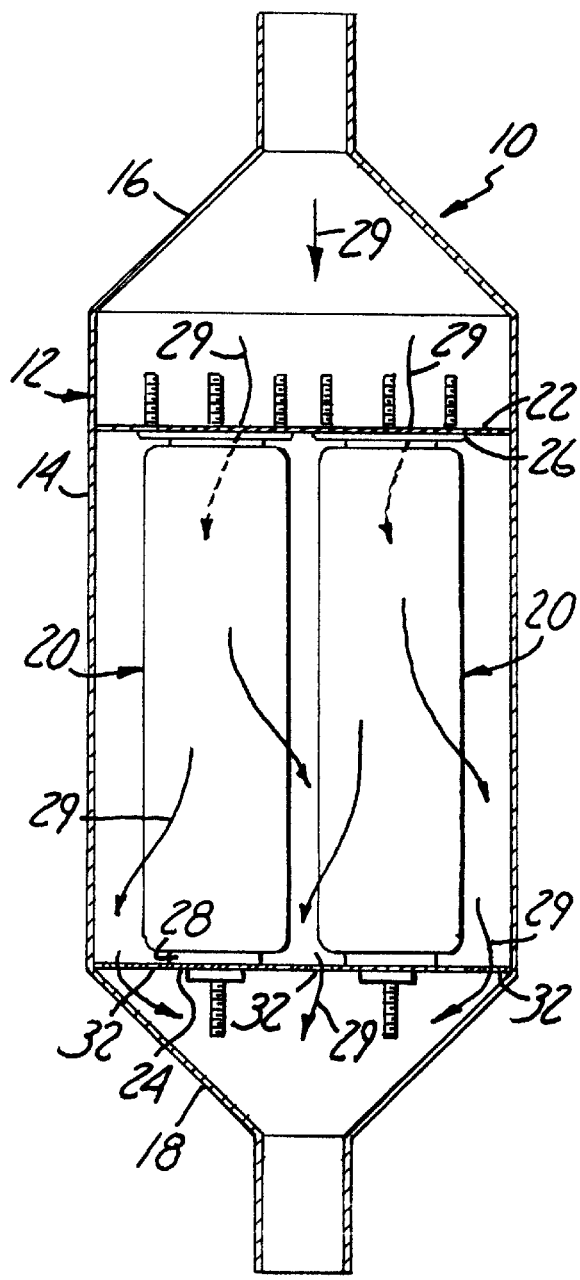
FIG. 1 is a sectional view of a diesel particulate trap utilizing the particulate cartridge of the invention.

In the description of the present invention and in the claims, the following terms are intended to have the meanings defined below:

"inorganic fiber" refers to any inorganic-based fiber which is resistant to high temperature (e.g. temperature above approximately 600° C.), is chemically resistant to diesel exhaust gas, and has textile qualities (i.e., is suitable for making into a yarn or fabric which can be made into the support tube or can be wound or wrapped around the support tube);

"tow" means a plurality or bundle of individual fibers or filaments;

"yarn" means a plurality or bundle of individual fibers or filaments which have been twisted together;

"continuous filament inorganic yarn" refers to any inorganic-based yarn which is resistant to high temperatures (e.g. temperatures above approximately 600° C.) and which is sufficiently long to wrap around the circumference of the support tube at least once; preferably the continuous yarn is at least 25 cm long and, more preferably, at least 1 meter long;

Referring to FIG. 1, a diesel particulate trap 10 includes a casing 12 comprising a cylindrical body 14, an exhaust inlet 16 and an exhaust outlet 18. Within the cylindrical body 14 are a plurality of parallel, side-by-side, filter assemblies 20, each of which is opened adjacent the exhaust inlet 16 and blocked adjacent to the exhaust outlet 18. The filter assemblies 20 extend between an end wall 22 adjacent exhaust inlet 16 and an end wall 24 adjacent exhaust outlet 18. The filter assemblies 20 are connected to the end wall 22 and the end wall 24 by an opened inlet tube 26 and a closed end cap 28, respectively. The end wall 22 and the end wall 24 are connected to the cylindrical body 14 and aid in directing exhaust gas 29 through the filter assemblies 20. End wall 22 blocks the spaces between adjacent filter cartridge 20 such that the exhaust gas (see arrows 29 in FIG. 1) entering the exhaust inlet 16 passes through opened inlet tube 26 and into the interior of the filter cartridge 20. The closed end cap 28 blocks the end of the filter assemblies 20 adjacent to the end wall 24 and forces the exhaust gas 29 to pass radially and outwardly through the filter cartridge 20 before exiting through apertures 32 in the end wall 24 adjacent to the exhaust outlet 18. In an alternative embodiment, the exhaust gas 29 may be directed such that the exhaust gas 29 flows radially from the outside of the filter cartridge 20 into the interior of the filter cartridge 20 and then out of an open end of the filter cartridge 20.

Figure 2:
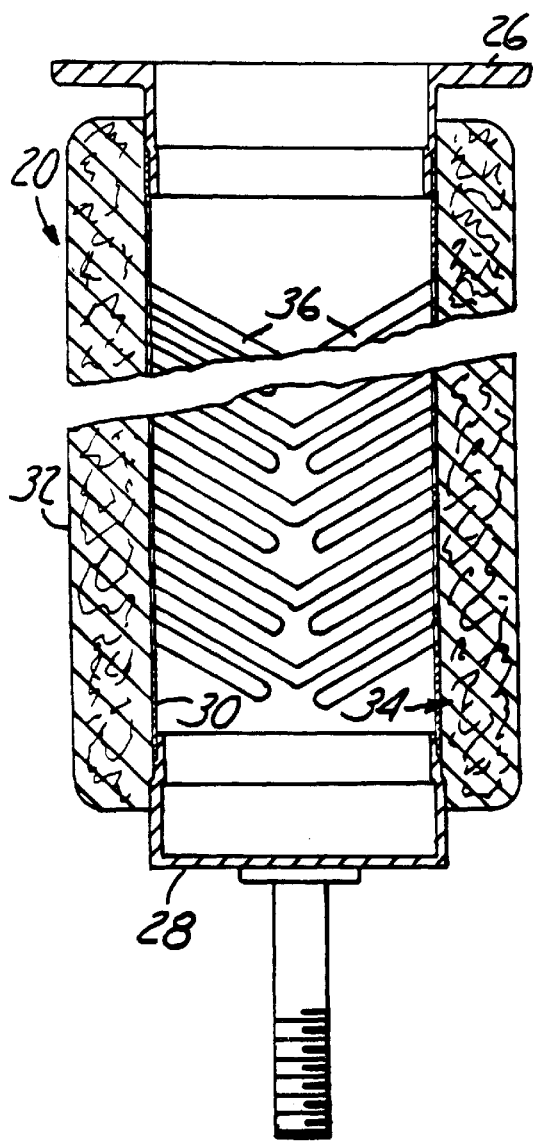
FIG. 2 is a sectional view of a prior art particulate cartridge.

A prior art filter cartridge 20 is shown in FIG. 2. The filter cartridge 20 is assembled as a cartridge. A perforated support tube 30 extends between the open inlet tube 26 and the closed end cap 28. A filtering element 32 is disposed over support tube 30, inlet tube 26, and end cap 28. The filter cartridge 20 thus consists of the support tube 30, open inlet tube 26, closed end cap 28, and filtering element 32.

The filtering element 32 may comprise several types of inorganic material. For example, inorganic yarn may be substantially helically wound or cross-wound over the support tube 30 to provide the filtering element 32. Optionally, more than one type of filtering material may be combined to form the filtering element 32. For example, a non-woven mat may be interposed between the support tube 30 and an inorganic yarn which is substantially helically wound or cross-wound over the non-woven mat and support tube 30. Any other combination of filtering materials which produces the desired filtering performance may be used. The inorganic material comprising the filtering element 32 may be glass fibers or ceramics, for example.

Figure 3:
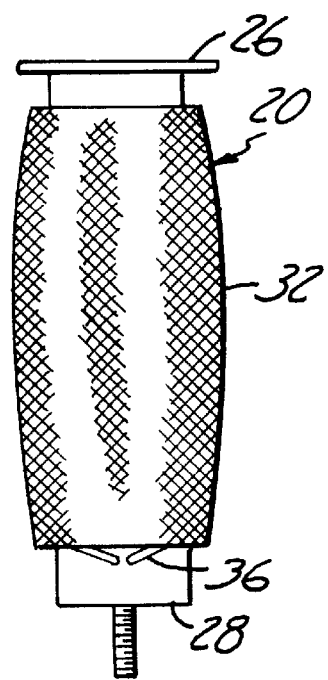
FIG. 3 is an elevational view of a prior art particulate cartridge with a "ballooning" filtering element.

As seen in FIG. 2, filtering element 32 extends over perforated support tube 30 and onto inlet tube 26 and end cap 28. The outer diameters of inlet tube 26 and end cap 28 approximately match the outer diameter of perforated support tube 30. As noted above, during use, exhaust gas 29 enters filter cartridge 20 through open inlet tube 26 and flows radially through filtering element 32. As the flow rate or pressure drop across the filter cartridge 20 is increased, the force exerted against the inside surface 34 of filtering element 32 increases. As illustrated in FIG. 3, the increase in force causes the filtering element 32 to expand ("balloon") near the middle of filter cartridge 20, which has the resultant effect of shortening the overall length of filtering element 32. As the effective length of filtering element 32 is shortened, perforations 36 in support tube 20 are exposed.

The only resistance to the ballooning effect is the seal between filtering element 32 and inlet tube 26, end cap 28 and support tube 30. The seal between the filtering element 32 and inlet tube 26, end cap 28 and support tube 30 is determined by the tension and winding angle at which the ceramic fiber is wound onto support tube 30. Seal strength is the function of the cosine of the wind angle times the tension in the ceramic fiber. The seal strength determines the flow rate and pressure drop the filter cartridge can withstand without ballooning. Currently, prior art filter cartridges as depicted in FIGS. 2 and 3 are limited to flow rates of approximately 45 acfm (1.27 m³/min) and pressure drops of about 60 inches $H_2O$ (14.91 kPa). Once the seal between the filtering element 32 and inlet tube 26, end cap 28 and support tube 30 is broken, perforations 36 in support tube 30 are exposed and exhaust is allowed to flow through perforations 36 without passing through filtering element 32. The resultant leak path reduces filter cartridge performance.

Figure 4:
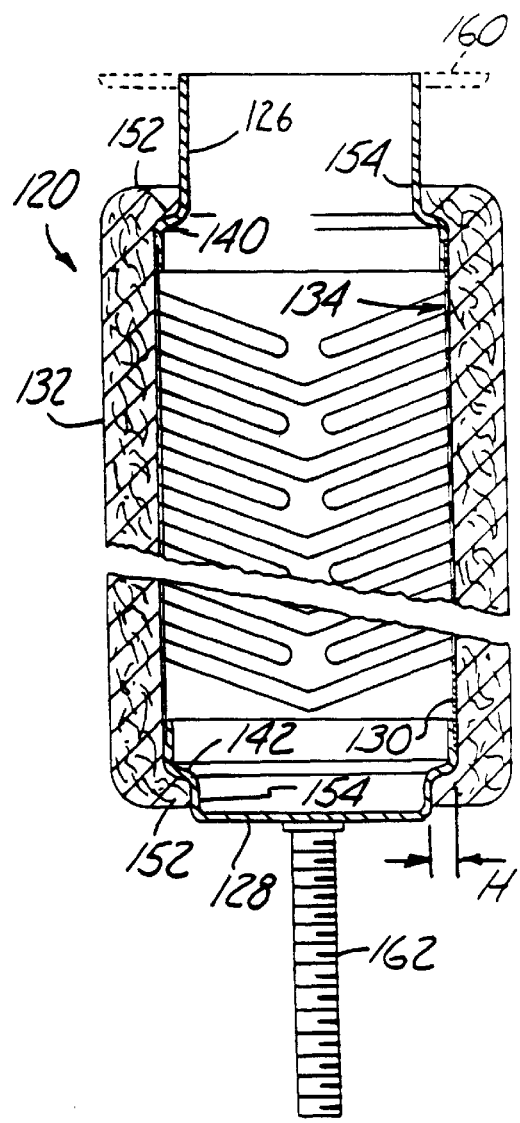
FIG. 4 is a sectional view of the particulate cartridge of the invention.

The present invention, seen in FIG. 4, overcomes the ballooning effect and consequently improves the flow rate and pressure drop capability of a regenerable fiber wound diesel particulate filter cartridge by improving the seal strength between the filtering element and the support tube. The filter cartridge 120 of the present invention includes an open inlet tube 126 and a closed end cap 128. A perforated support tube 130 extends between the open inlet tube 126 and the closed end cap 128. A filtering element 132 is disposed over support tube 130, inlet tube 126 and end cap 128. Filtering element is preferably formed by an inorganic yarn substantially helically wound or cross-wound on support tube 130.

Inlet tube 126 and end cap 128 are "stepped" and include radial shoulders 140, 142, respectively. As can be seen by comparing the inventive filter cartridge 120 in FIG. 4 and the prior art filter cartridge 20 of FIG. 2, the filtering element 32 of the prior art filter cartridge is positioned on the support tube 30 in a manner significantly different than the way in which filtering element 132 is positioned on support tube 130 of the inventive filter cartridge 120. In the inventive filter cartridge 120, the helically wound or cross-wound yarn of filtering element 132 extends over radial shoulders 140, 142 such that end portions 152 of filtering element 132 extend onto the reduced diameter portion 154 of inlet tube 126 and end cap 128, respectively. Radial shoulders 140, 142 permit an increase in the seal strength between the filtering element 132 and the support tube 130. Radial shoulders 140,142 have a height "H" sufficient to allow the helically wound or cross-wound yarn of filtering element 132 to be secured to support tube 130. Preferably, radial shoulders 140, 142 have a height "H" in the range of ⅛ inch to ¾ inch (3.2 mm to 19.0 mm).

As the pressure drop across the inventive filter cartridge 120 increases and the force exerted on inside surface 134 of the filtering element 132 increases, the filtering element 132 which extends over radial shoulder 140, 142 is not allowed to move. As the middle portion of filtering element 132 tries to "balloon" due to the increasing pressure drop across the filtering element 132, the portions 152 of filtering element 132 which extend over radial shoulders 140, 142 are restrained from moving. The effective length of filtering element 132 cannot be shortened if end portions 152 are restrained, and filtering element 132 is thus prevented from ballooning. This allows the filter cartridge 120 to handle higher flow rates and pressure drops than the prior art filter cartridge 20 shown in FIG. 2 while maintaining filter performance.

In a preferred embodiment of inventive filter cartridge 120, support tube 130 is an electrically resistive tube like that disclosed in U.S. Pat. No. 5,409,669 to Smith et al. (incorporated herein by reference). To aid in securing filtering cartridge 120 in a diesel particulate trap (as shown in FIG. 1), a base plate 160 and mounting stud 162 may be secured to inlet tube 126 and end cap 128, respectively. Alternatively, filtering cartridge 120 may be secured in a diesel particulate trap by other means known in the art, such as by welding, bolting, etc.

As noted above, in a preferred embodiment of the present invention, the filtering element 132 is formed by an inorganic yarn substantially helically wound or cross-wound around the support tube 130. Examples of winding techniques of the inorganic yarn about the support tube 130 are found in U.S. Pat. No. 5,248,481 to Bloom, et al., describing a laterally offset winding procedure, and U.S. Pat. No. 5,248,482 to Bloom, et al., describing a radially aligned winding procedure. U.S. Pat. No. 5,248,481 and U.S. Pat. No. 5,248,482 are herein incorporated by reference.

In the lateral offset winding procedure, a continuous filament yarn which has been texturized to provide a plurality of loops of continuous fibers or fiber segments extending from the core of the yarn is substantially helically cross-wound around the support tube to form a plurality of layers of yarn. Successive convolutions of the yarn are oppositely wound in layers to provide interwoven cores. The cores of successive convolutions of each successive layer are spaced to define four-sided openings, with the loops of fibers or fiber segments on the texturized yarn projecting into each of the four-sided openings to provide a trap for particulates in the gas. The cores of the yarn in at least one layer are laterally offset from the cores of yarn in an adjacent layer to deflect the gas into a tortuous path through the filtering material.

The radially aligned winding procedure also uses a texturized continuous filament yarn which is cross-wound around the support tube. Successive convolutions of yarn are oppositely wound in layers to provide interwoven cores, with the cores of the successive convolutions of each layer radially aligned to provide walls that are spaced to define four-sided openings. The loops of fibers or fiber segments of the texturized yarn project into each of the four-sided opening to provide a trap for diesel exhaust particulates.

Preferably, the inorganic yarn wound or cross-wound over the support tube 130 has a diameter in the range from about 0.5 to about 5 mm. More preferably, the diameter is in the range from about 1 to about 3 mm. Such yarns are typically comprised in the range from about 780 to about 7,800 individual inorganic fibers. Preferably, the inorganic yarn comprises in the range from about 1,560 to about 4,680 individual fibers. Preferably, the inorganic yarn is ply-twisted because such construction can be texturized to provide a superior filtering material when compared to inorganic yarn which is not ply-twisted.

Texturization of the inorganic yarn improves its filter or trapping efficiency. Preferably, the inorganic yarn is texturized such that it is lofty, e.g., by being texturized so that loops of continuous fibers, individual fiber segments or a combination thereof extend outwardly from a dense core. Loops of continuous fibers are most preferred. The inorganic yarn can be texturized by techniques known in the art including, for example, air jet or mechanical texturization. Air jet texturization is preferred because it generally provides a texturized yarn having fewer fiber segments and more fiber loops than does yarn texturized by the mechanical technique. A suitable air jet texturizing machine for this purpose is available under the trade designation MODEL 17 SIDEWINDER from Enterprise Machine and Development Corporation of New Castle, Del. Preferably, the texturized inorganic yarn has a diameter in the range from about 1 to about 10 mm. More preferably, the diameter of the texturized inorganic yarn is in the range from about 3 to about 6 mm.

The inorganic fibers which comprise the inorganic yarn preferably have a diameter in the range from about 5 to about 20 micrometers. More preferably, the inorganic fibers have a diameter in the range from about 7 to about 15 micrometers. Fibers having a diameter within the specified ranges generally are easier to make and texturize than are fibers having diameters substantially outside of these ranges. Further, fibers substantially below 5 micrometers in diameter tend to be easily damaged (i.e., broken when texturized). Fibers substantially above 25 micrometers in diameter typically provide a filter which is less efficient than do fibers having diameters within the specified ranges.

The inorganic fibers comprising the inorganic yarn are preferably heat resistant. The heat resistant fibers can be, for example, amorphous, polycrystalline, or a combination thereof Useful heat resistant fibers include special high temperature glass fibers, such as S2 GLASS or E GLASS, commercially available from Owens-Corning of Toledo, Ohio; continuous fused silica fibers, such as QUARTZEL™ fused quartz yarn, commercially available from Quartz Products Corporation of Louisville, Ky.; and fibers of ceramic metal oxides such as NEXTEL™ 312, 440 or 550 ceramic fibers, commercially available from 3M Company of St. Paul, Minn. Knitted, woven or braided fabrics made from blends of the glass and ceramic yarns could also be used. For applications below approximately 330° C., conventional glass fibers could be used.

For enhanced filtering efficiency, inorganic yarn is preferably substantially helically wound or cross-wound around the support tube 130 as described above. The inorganic yarn may be wound about the support tube 130 such that the cores of the successive convolutions of each successive layer are radially aligned (as described in U.S. Pat. No. 5,248,482), or the inorganic yarn may be wound about the support tube 130 such that the cores of successive convolutions of successive layers are laterally offset from each other (as described in U.S. Pat. No. 5,248,481).

Preferably, each filtering element has a thickness in the range from about 1 to 25 mm. For filtering elements comprising substantially helically wound or cross-wound, texturized yarn comprising inorganic fibers, the preferred total thickness of the wound or cross-wound fibers is in the range from about 5 to about 15 mm. Thicknesses substantially greater than the stated ranges may unduly increase cost and may also result in undesirably high back pressures, whereas thicknesses substantially smaller than the stated ranges may provide inadequate filtering efficiency.

Each filtering element 132 can alternatively comprise one or more layers of more than one type of filtering material. For example, the filtering element 132 can comprise one or more layers of substantially helically wound or cross-wound inorganic yarn, or it can comprise one or more layers of non-woven mats comprising inorganic fibers, wherein the mat is held against the support tube 130 by substantially helically wound or cross-wound inorganic yarn.

The following examples are provided to illustrate the improved performance created by the invention, but not intended to be limiting thereof.

EXAMPLES

Tests were performed to determine the improvement in filter cartridge performance with the "stepped" cartridge design. Test 1 was a short term, high pressure drop and high flow rate test. Test 2 was a long term durability test with an elevated pressure drop and high flow rate. Test 3 was a characterization test to fully characterize the differences between the prior art filter cartridge 20 and the inventive filter cartridge 120 (incorporating the "stepped" inlet tube 126 and "stepped" end cap 128).

Test 1: Short Term High Pressure Drop and High Flow Rate

The objective of Test 1 was to study the short term steady state filter performance of a prior art electrically regenerable filter cartridge, and the inventive filter cartridge. The prior art filter cartridge and the inventive filter cartridge were identical in all respects except for the provision of a "stepped" inlet tube on the inventive filter cartridge. The filtering elements of the two test cartridges were otherwise identical. Conditions for the test were: 1) 10 minute regeneration with one minute following for cool down; 2) Regeneration was triggered at 60 kPa; 3) Exhaust flow through the cartridges was 2.81 m$^3$/minute/cartridge with an exhaust manifold temperature of 450° C.; 4) Exhaust was created by a 2.3 liter 4 cylinder diesel engine at 1845 rpm and 98 N*m load; 5) Low sulfur fuel (0.05%) and low ash-oil was used; and 6) Two filters cartridges were placed in one test canister.

Test conditions used in this test created a five-fold increase in the pressure drop and a two-fold increase in the flow rate over those typically handled by a prior art filter cartridge.

The data collected during the test included the time between regenerations and the post regeneration back pressure. This test determined the short term performance of the invention. The invention was tested by loading the filter cartridges (the prior art cartridge and the inventive cartridge) with soot to the predetermined pressure drop of 60 kPa. Once the filter cartridges reached that pressure drop they were regenerated and the load cycle repeated. The test ran for twenty-four hours to record the load time between regenerations.

If the load time between regenerations had remained constant, the filter cartridges would pass the test. This means there would be no change in performance of the filter cartridges during the test. Table 1 presents the results of the test between the standard filter cartridge and the filter cartridge with the stepped inlet tube of the present invention.

As the data in Table 1 shows, the prior art filter cartridge failed after 5 hours of operation. The time required for the prior art filter cartridge to reach the pressure drop necessary to trigger regeneration had increased to 300 minutes, indicating a leak had developed. Examination of the prior art filter cartridge showed the "ballooning" effect taking place. Further use resulted in total failure of the prior art filter assembly, as evidenced by a load time of infinity (indicating that the pressure drop required to trigger regeneration was never achieved). In contrast, the inventive filter cartridge passed the test. Although the final load time of the inventive filter cartridge increased from 105 to 120 minutes, this is a vast improvement over the prior art filter cartridge.

TABLE 1

Performance Results

|  | Prior Art Filter Cartridge | Inventive Filter Cartridge |
|---|---|---|
| Initial Load Time (0 hours) | 180 minutes | 105 minutes |
| Intermediary Load Time (5 hours) | 300 minutes | 100 minutes |
| Final Load Time (20 hours) | Infinity* | 120 minutes |

*The pressure drop leveled off and did not increase, so the regeneration trigger limit was never reached.

Test 2: Long Term High Pressure Drop and High Flow Rate Test

The objective of Test 2 was to study the long term steady state (at a high flow rate and high pressure drop level) filter performance of the inventive filter cartridge. Filter cartridge performance was observed over an operating period of approximately 1500 hours. The "stepped" design was installed on both the inlet tube 126 and end cap 128 of the inventive filter cartridge. Conditions for the test were as follows: 1) 10 minute regeneration with one minute following for cool down; 2) Regeneration was triggered at 40 kPa; 3) Exhaust flow through the cartridges was 2.8 m$^3$/minute/cartridge with an exhaust manifold temperature of 450° C.; 4) Exhaust was created by a 2.3 liter 4 cylinder engine at 1845 rpm and 98 N*m load; 5) Low sulfur fuel (0.05%) and low ash oil was used; and 6) Two filter cartridges were placed in one canister. Characteristics of the inventive filter cartridge performance which were observed included load time between regenerations and filtration efficiency.

Load Time

The load time is the time required for the filters to load from the post regeneration pressure drop to a pressure drop of 40 kPa. The load time of the filter cartridge ranged from 45–50 minutes at the onset of testing to approximately 20 minutes at the end of the testing period. The load time will naturally decrease over time as the filter cartridges fill with byproducts of burnt lubricating oil that have passed through the engine. The byproducts of burnt lubricating oil are called oil ash. If the load time was increasing with time, it would indicate that the inventive filter cartridge had failed. Load time would increase if the seal between the filtering element and structural heater support tube was failing and allowing the exhaust flow to leak. Because the load time decreased over time, no leaking occurred in the inventive filter cartridge.

Efficiency Measurements

The inventive filter cartridge efficiencies ranged from 78–98% for the duration of the test. The efficiencies were taken at a pressure drop of 35 kPa. The efficiency of the inventive filter cartridge increased as the test progressed. The increase in efficiency was due to the accumulation of oil ash within the filtration media. Oil ash collects inside the filtering element and acts as an additional filtering mechanism. The fact that the filter cartridges maintained efficiency throughout the duration of the test indicates that no leak paths were present within the filter cartridge. Further, the inventive filter cartridge maintained its high efficiency despite the increasing pressure drop. Notably, the prior art filter cartridge failed at the highest pressure drop tested.

Test 3: Characterization Testing of the Filter Cartridge with and without the Invention Test 3 was performed on a 3.4 liter indirect injection Cummins diesel engine. The operating conditions for testing were 1560 rpm of engine operating speed and 132 N*m of load on the engine. The test compares the filtration efficiency of a prior art filter cartridge and the inventive filter cartridge. Table 2 shows the results of Test 3.

Table 2 shows that the inventive filter cartridge was able to maintain similar performance to the prior art filter cartridge at lower flow rates and continued to perform at increased flow rates. While the difference in efficiency between the inventive filter cartridge and the prior art filter cartridge was less at high flow rates, the inventive filter cartridge maintained its filtering efficiency, without failure, to the highest pressure drop tested.

The combined test results show that the inventive filter cartridge was able to maintain durability at an elevated flow rate and pressure drop while maintaining high efficiency levels. The inventive filter cartridge thus exhibits clearly superior performance over the prior art filter cartridges.

TABLE 2

Efficiency Comparisons of the Invention

| | | without Invention | with Invention |
|---|---|---|---|
| 35 acfm (1.0 m³/minute) per cartridge | Efficiency @ 20" H₂O (4.97 kPa) | 87% | 95% |
| | Efficiency @ 80" H₂O (19.88 kPa) | 90% | 97% |
| | Efficiency @ 140" H₂O (34.80 kPa) | NA | 98% |
| 140 acfm (3.96 m³/minute) per cartridge | Efficiency @ 20" H₂O (4.97 kPa) | 67% | 67% |
| | Efficiency @ 80" H₂O (19.88 kPa) | 66% | 63% |
| | Efficiency @ 140 H₂O (34.80 kPa) | NA | 63% |

Although the present invention has been described with reference to preferred embodiments, workers skilled in the art will recognize that changes may be made in form and detail without departing from the spirit and scope of the invention.

What is claimed is:

1. A diesel particulate filter cartridge comprising:
   a longitudinal hollow tube having a perforated portion, a hollow tube end portion and a shoulder therebetween, said hollow tube end portion having a first outer diameter, said perforated portion having a second outer diameter, said first diameter being smaller than said second diameter, and said shoulder connecting said first diameter and said second diameter; and
   a filtering element comprising a filtering material and disposed on said hollow tube, said filtering material extending over said second diameter of said perforated portion and over said first diameter of said hollow tube end portion and engaging said shoulder so as to restrain said filtering element from moving along said hollow tube.

2. The diesel particulate filter cartridge of claim 1, wherein said hollow tube includes an electrically resistive heating element.

3. A diesel particulate filter cartridge comprising:
   a hollow tube having an imperforate first end portion and an imperforate second end portion, the first end portion and the second end portion separated by a longitudinal perforated central portion extending between the first end portion and the second end portion, a first shoulder formed between the first end portion and the central portion and a second shoulder formed between the second end portion and the central portion, the first end portion and the second end portion having first outer diameters, and the perforated central portion having a second outer diameter, the first diameters being smaller than the second diameter, and each shoulder connecting one first diameter to the second diameter; and
   a filtering element disposed on the hollow tube, the filtering element having a first filtering element end portion extending over the imperforate first end portion, a filtering element middle portion extending over the perforated central portion, and a second filtering element end portion extending over the imperforate second end portion, wherein the first filtering element end portion engages the first shoulder and the second filtering element end portion engages the second shoulder so as to restrain the filtering element from ballooning.

4. The diesel particulate filter cartridge of claim 3, wherein the first end portion is sealed.

5. The diesel particulate filter cartridge of claim 3, wherein the hollow tube is an electrically resistive heating element.

6. The diesel particulate cartridge of claim 3, wherein the filtering element comprises a heat resistant yarn helically cross-wound on the hollow tube, including each shoulder, to form a plurality of layers of yarn, with successive convolutions oppositely wound in each layer to provide interwoven cores and so as to engage each shoulder to restrain the filtering element from ballooning.

7. The diesel particulate filter cartridge of claim 6, wherein the yarn is an inorganic yarn.

8. A diesel particulate filter comprising:
   a casing having an exhaust inlet and outlet connectable to an exhaust system; and at least one diesel particulate filter cartridge mounted in said casing, said at least one diesel particulate filter cartridge comprising:
   a longitudinal hollow tube having a hollow tube end portion, a perforated portion and a shoulder therebetween, said hollow tube end portion having a first outer diameter, said perforated portion having a second outer diameter, said first diameter being smaller than said second diameter, and said shoulder connecting said first diameter and said second diameter; and
   a filtering element disposed on said hollow tube, said filtering element extending over said second diameter of said perforated portion and said filtering element having a filtering element end portion extending over said first diameter of said hollow tube end portion and engaging said shoulder so as to restrain said filtering element from moving along said hollow tube.

9. A diesel particulate filter cartridge comprising:
   a longitudinal hollow tube having two ends, a hollow tube end portion at one end and a perforated portion, said hollow tube end portion having a first outer diameter, said perforated portion having a second outer diameter, and said first diameter being smaller than said second diameter so as to form a shoulder between said first diameter and said second diameter; and
   a filtering element disposed on said hollow tube, said filtering element extending over said second diameter of said perforated portion and having a filtering element end portion which contacts said shoulder so as to restrain said filtering element from moving toward the other end of said hollow tube.

10. The diesel particulate filter cartridge of claim 9, wherein said filtering element comprises a filtering material that is operatively adapted for filtering particulate from the exhaust of a diesel engine.

11. The diesel particulate filter cartridge of claim 9, wherein said hollow tube has one of said hollow tube end portion at each end thereof, said filtering element has two ends with one of said filtering element end portion at each end thereof, and each said filtering element end portion contacts one said shoulder so as to restrain said filtering element from ballooning.

12. The diesel particulate filter cartridge of claim 11, wherein each said filtering element end portion extends over and contacts said first diameter of one said hollow tube end portion.

13. The diesel particulate filter cartridge of claim 9, wherein said filtering element end portion extends over and contacts said first diameter of said hollow tube end portion.

14. The diesel particulate filter of claim 8, wherein said hollow tube has two ends with one of said hollow tube end portion and one of said shoulder at each end thereof, said filtering element has two ends with one of said filtering element end portion at each end thereof, and each said filtering element end portion engages one said shoulder so as to restrain said filtering element from ballooning.

15. The diesel particulate filter of claim 14, wherein each said filtering element end portion contacts the corresponding shoulder so as to restrain said filtering element from ballooning.

16. The diesel particulate filter of claim 8, wherein said exhaust inlet and outlet are connectable to the exhaust system of a diesel engine and said filtering element comprises a filtering material that is operatively adapted for filtering particulate from the exhaust of a diesel engine.

17. The diesel particulate filter cartridge of claim 1, wherein said filtering material is operatively adapted for filtering particulate from the exhaust of a diesel engine.

18. The diesel particulate filter cartridge of claim 1, wherein said filtering material extends over and contacts said first diameter of said hollow tube end portion.

19. The diesel particulate filter cartridge of claim 1, wherein said hollow tube has two ends with one of said hollow tube end portion and one of said shoulder at each end thereof, said filtering element has two ends with said filtering material at each end thereof engaging one said shoulder so as to restrain said filtering element from ballooning.

* * * * *